United States Patent Office 3,484,844
Patented Dec. 16, 1969

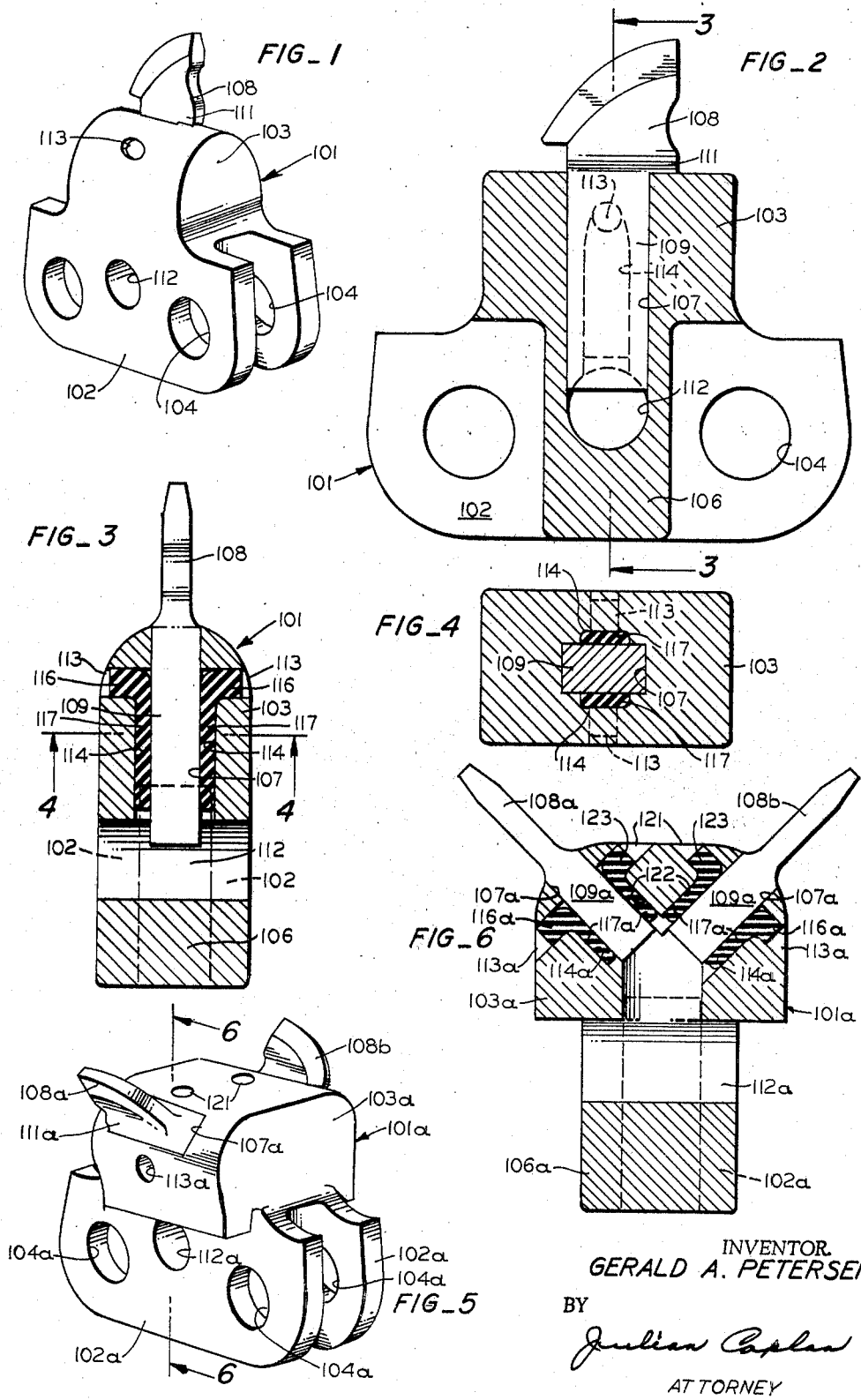

3,484,844
RESILIENT RETAINING MEANS FOR RIPPER CHAIN TEETH
Gerald A. Petersen, Cupertino, Calif., assignor of one-half to Anita E. Petersen, Saratoga, Calif.
Original application Dec. 14, 1964, Ser. No. 418,073, now Patent No. 3,357,117, dated Dec. 12, 1967. Divided and this application Apr. 28, 1967, Ser. No. 641,093
Int. Cl. E02f 9/28; E21c 13/00
U.S. Cl. 37—142      2 Claims

ABSTRACT OF THE DISCLOSURE

A ripper chain of the type used in mining machinery has links formed with sockets to receive removable cutting teeth. The teeth are detachably secured in their sockets by resilient inserts inserted through holes in the socket wall and compressed between the tooth and wall.

---

This application is a division of my co-pending application Ser. No. 418,073, filed Dec. 14, 1964, now Patent No. 3,357,117.

This invention relates to a new and improved resilient retaining means for ripper chain blades or teeth. The resilient retainer is compressed between the blade and its holder and provides frictional resistance to unintentional disengagement of the parts.

It is a principal purpose of the present invention to provide means for retaining a tooth on a permanent portion of a chain in such manner that it may be removed and sharpened, replaced, or otherwise repaired, and yet to provide a secure enough retention to prevent unintentional separation.

A particular advantage of the present invention is the facility with which the blade or tooth may be installed and removed and the fact that no special tools or other equipment are required for such purpose.

Still another advantage of the invention is the fact that the resilient insert which secures the blade on its holder accommodates minor variations in the construction of the blade and holder and thereby makes close tolerances of dimensions of the mating parts unnecessary, and further accommodates wears of parts with passage of time.

In one form of the invention, hereinafter described in detail, the resilient retainer is inserted in a hole in one of the mating parts extending outwardly from the hole so that it is contacted by the other mating part when the two members are forced together. The exposed end of the resilient insert is bent into a groove formed in one of the parts and compressed between the bottom of the groove and the adjacent wall of the facing member. The cross-sectional shape of the groove is substantially different from the initial unstressed shape of the resilient insert and hence there is considerable deformation of the insert which increases the area of surface contact. Hence the frictional resistance to unintentional dislodgment of the blade from the holder is increased.

Another principal feature of the present invention is the fact that neither bolts, metal keys, nor similar fasteners, nor welding to secure the tooth on the chain link are used, thereby eliminating a considerable amount of the difficulty heretofore occasioned in securing teeth to their holders and removing the teeth from the holders when required.

Other objects of the present invention will become apparent upon reading the following specification and referring to the accompanying drawings in which similar characters of reference represent corresponding parts in each of the several views.

In the drawings:
FIG. 1 is a perspective view of a further modification showing the invention applied to a removable tooth for a mining machine.
FIG. 2 is an enlarged longitudinal midsection of the structure of FIG. 1.
FIGS. 3 and 4 are sectional views taken substantially along lines 3—3 of FIG. 2 and line 4—4 of FIG. 3, respectively.
FIGS. 5 and 6 are views similar to FIGS. 1 and 3, respectively, of a modification having plural teeth.

FIG. 1 shows adaptation of the principle of Ser. No. 418,073, to a removable tooth used in ripper chains of mining machinery and similar equipment. A well-known manufacturer of this type equipment is Joy Manufacturing Company of Pittsburgh, Pa. A link 101 having spaced sides 102 and connecting member 103 is attached to adjacent links (not shown) through pins (not shown) passing through holes 104 at either end of each side 102. A socket 107 forming boss 106 is located below connecting member 103 and between sides 102. Received in socket 107 in member 106 and protruding out the top is tooth 108 of hardened material. The shank 109 of tooth 108 is non-circular (here shown as rectangular) and socket 107 is complementary. Shoulder 111 is formed on shank 109 to limit inward movement of the tooth. A knock-out hole 112 is formed in member 106 and sides 102 to receive a drift pin to force the tooth out of its socket when it is necessary.

Conventionally, tooth 108 is retained in socket 107 by a set screw. The present invention provides means for holding the tooth in place without use of a set screw. Thus holes 113 are formed in either side of connecting member 103 extending into socket 107. Grooves 114 are formed in the walls of socket 107 longitudinally of the tooth. Resilient inserts 111 are inserted through one or both holes 113 and compressed into grooves 114. Inserts 116 restrain unintentional withdrawal of the tooth from its socket. Insert 116 is the same as inserts 36 and 88 in the form of a resilient material, preferably an elastomeric material such as neoprene synthetic rubber. However, natural rubber, other synthetic rubber, nylon cord, latex dipped nylon cord, soft iron wire, or other resilient substances may be used. The relationship of the width and depth of groove 114 to the uncompressed initial cross-section of insert 116 is also as in Ser. No. 418,073, namely, the cross-sectional shape of insert 111 in its initial dimensions are slightly less than the corresponding dimensions of hole 113, so that the insert 111 may be slipped through hole 113 and extend perpendicular to the direction of insertion of the blade in the holder. The length of insert 111 is such that in its position extending through hole 113 it projects into socket 107. Accordingly, when tooth 108 is pushed into socket 107, the exposed end of insert 111 is engaged and bent into groove 114. By reason of the cross-sectional shape of groove 114, relative to the initial or uncompressed shape of insert 111, the exposed portions 117 is deformed to the shapes shown in FIGS. 3 and 4, conforming generally to the shape of groove 114. The length of grooves 114 in a longitudinal direction is sufficient to accommodate the distortion of insert 111. It will further be seen, particularly with reference to FIG. 4, that the area of surface contact of deformed portion 117 with tooth 109 is of extended scope, as compared with what such area would be if groove 114 were less shallow and wide. Hence the frictional resistance to withdrawal of the tooth from the holder is augmented.

To install tooth 108 in socket 107, preliminarily one or more inserts 116 are installed in holes 113, and into socket 107. Tooth shank 109 is then forced into the socket and its end bends insert 116 back onto groove 114. The inserts are deformed as indicated by numeral 117 and the area of frictional contact with the sides of tooth is augmented. Thus withdrawal of the tooth is frictionally resisted against all normal strains. When it is necessary to remove the tooth, insertion of a drift pin in hole 112 will force the tooth out against the frictional resistance of insert 116.

FIGS. 5 and 6 show a modification wherein a pair of sockets 107*a* is formed in connecting member 103*a* of link 101*a* disposed slanted outwardly, each socket 107*a* receiving a tooth 108*a*, 108*b*. One or more holes 113*a*, 121 is provided in connecting member 103*a* for each socket and grooves 114*a*, 122 are formed below holes 113*a*, 121, respectively, similarly as in the preceding modification. Resilient inserts 116*a*, 123, are in FIGS. 1–4. Installation of the teeth 108*a*, 108*b* is as previously described. A tool may be inserted through knockout hole 112*a* to drive the tooth from the socket when required. Many of the elements of link 101*a* are substantially the same as in the modification of FIGS. 1–4 and the same reference numerals followed by subscript *a* are used to represent corresponding parts.

Although the foregoing invention has been described in some detail, by way of illustration and example for purpose of understanding, it is understood that certain changes and modifications may be practiced within the spirit of the invention.

What is claimed is:

1. In earth digging equipment, a chain link, a blade and a resilient retainer, said link formed with a recess having at least one first wall, said blade formed with an extension complementary to said recess and having at least one second wall facing and in close proximity to said first wall, said extension sliding longitudinally into said recess, at least one said wall formed with a longitudinally extending groove, a transverse hole in said first wall, said retainer fitting in said hole and being compressed into said groove and resiliently deformed in contact with said second wall to frictionally restrain longitudinal relative movement of said blade and link, said blade projecting out of said link to provide a cutter as said chain is advanced, said groove having a cross-sectional area substantially less than the initial uncompressed cross-sectional area of said retainer, said groove being substantially wider in a directional transverse to the direction of insertion of said blade in said link than the depth of said groove whereby the compressed shape of said retainer provides an extended surface of frictional contact between said blade and link.

2. The combination of claim 1, in which said link has sides and a connecting member between said sides, a plurality of said recesses formed in said connecting member diverging laterally outward, each said recess having a blade, hole and groove, there being at least one resilient retainer for each said recess, each said blade protruding from said connecting member to cut as the chain is advanced.

References Cited
UNITED STATES PATENTS

| | | |
|---|---|---|
| 2,780,014 | 2/1957 | Arps. |
| 2,838,295 | 6/1958 | Compton _____ 299—93 X |
| 3,057,091 | 10/1962 | Petersen. |
| 3,127,153 | 3/1964 | Elders _____ 299—92 |

ROBERT E. BAGWILL, Primary Examiner

U.S. Cl. X.R.

299—92